(12) United States Patent
Rhim et al.

(10) Patent No.: US 10,827,306 B2
(45) Date of Patent: Nov. 3, 2020

(54) INTELLIGENT EVENT INFORMATION PRESENTATION METHOD AND TERMINAL

(71) Applicant: Samsung Electronics Co., Ltd., Gyeonggi-do (KR)

(72) Inventors: Eunhee Rhim, Gyeonggi-do (KR); Suckho Seo, Gyeonggi-do (KR); Kisuh Ahn, Seoul (KR); Hyejung Yang, Gyeonggi-do (KR); Kyungsoo Lim, Gyeonggi-do (KR); Jinha Jun, Seoul (KR); Siejoon Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 211 days.

(21) Appl. No.: 15/720,818

(22) Filed: Sep. 29, 2017

(65) Prior Publication Data
US 2018/0024714 A1 Jan. 25, 2018

Related U.S. Application Data

(63) Continuation of application No. 13/856,799, filed on Apr. 4, 2013, now Pat. No. 9,785,315.

(30) Foreign Application Priority Data

Apr. 4, 2012 (KR) .................. 10-2012-0035000

(51) Int. Cl.
*G06F 3/048* (2013.01)
*H04W 4/02* (2018.01)
(Continued)

(52) U.S. Cl.
CPC .......... *H04W 4/027* (2013.01); *G06F 1/3262* (2013.01); *G06F 3/04883* (2013.01); *H04M 1/67* (2013.01);
(Continued)

(58) Field of Classification Search
CPC ..... G06F 3/00; G06F 3/01; G06F 3/14; G06F 3/033; G06F 3/041; G06F 3/048;
(Continued)

(56) References Cited

U.S. PATENT DOCUMENTS 6,957,398 B1 * 10/2005 Nayeri ................ G06F 16/9535
715/867
7,581,188 B2 8/2009 Hiles
(Continued)

FOREIGN PATENT DOCUMENTS

| KR | 10-2005-0036281 | 4/2005 |
| KR | 1020100120958 | 11/2010 |

OTHER PUBLICATIONS

Korean Office Action dated Nov. 16, 2017 issued in counterpart application No. 10-2012-0035000, 10 pages.

*Primary Examiner* — Xiomara L Bautista
(74) *Attorney, Agent, or Firm* — The Farrell Law Firm, P.C.

(57) ABSTRACT

An intelligent event information presentation method and terminal is provided for facilitating information utilization by processing various event information, intelligently generated in association with a function of the terminal. The event information presentation method of the present invention includes collecting event information; and presenting at least one of the collected event information, according to a current operation mode.

17 Claims, 7 Drawing Sheets

(51) Int. Cl.
  *H04W 4/029*   (2018.01)
  *G06F 1/3234*  (2019.01)
  *H04M 1/725*   (2006.01)
  *G06F 3/0488*  (2013.01)
  *H04M 1/67*    (2006.01)
  *H04W 4/18*    (2009.01)

(52) U.S. Cl.
  CPC ....... *H04M 1/725* (2013.01); *H04M 1/72569* (2013.01); *H04W 4/029* (2018.02); *H04M 1/72547* (2013.01); *H04M 1/72572* (2013.01); *H04M 2250/12* (2013.01); *H04M 2250/22* (2013.01); *H04W 4/18* (2013.01)

(58) Field of Classification Search
  CPC .... G06F 3/0484; G06F 3/0481; G06F 3/0488; G06F 9/4443; H04B 1/38; H04B 1/40; H04W 4/02; H04W 4/12; H04W 4/22; G08B 1/08; H04M 1/00; H04M 1/18; H04M 3/00; H04M 11/06; H04M 11/062; H04M 15/06; H04M 17/00; H04M 17/02; H04L 12/587
  See application file for complete search history.

(56) References Cited

U.S. PATENT DOCUMENTS

| | | | | |
|---|---|---|---|---|
| 8,106,852 B2* | 1/2012 | Fujinawa | ............... | G02F 1/1347 345/4 |
| 2003/0052928 A1* | 3/2003 | Williams | ................ | H04L 29/06 715/867 |
| 2004/0049419 A1* | 3/2004 | Knight | ................... | G06Q 30/02 705/14.64 |
| 2007/0171192 A1* | 7/2007 | Seo | ................... | H04M 1/72544 345/156 |
| 2007/0298843 A1 | 12/2007 | Kwon | | |
| 2008/0132290 A1 | 6/2008 | Sharabi | | |
| 2008/0134063 A1* | 6/2008 | Volach | .................... | H04L 51/04 715/762 |
| 2009/0143114 A1* | 6/2009 | Vargas | ............. | H04W 52/0258 455/574 |
| 2009/0315705 A1 | 12/2009 | Kim | | |
| 2010/0035656 A1 | 2/2010 | Pan | | |
| 2010/0107128 A1* | 4/2010 | Thukral | ................. | G06F 3/1454 715/867 |
| 2010/0283735 A1 | 11/2010 | Kim et al. | | |
| 2010/0309096 A1* | 12/2010 | Inoh | .................... | G02F 1/13476 345/5 |
| 2011/0251899 A1 | 10/2011 | Proulx | | |
| 2011/0292061 A1 | 12/2011 | Mineo | | |
| 2011/0306304 A1 | 12/2011 | Forutanpour | | |
| 2012/0032945 A1* | 2/2012 | Dare | ..................... | G06F 3/0481 345/418 |
| 2012/0036441 A1* | 2/2012 | Basir | .................... | H04M 1/642 715/734 |
| 2012/0102409 A1 | 4/2012 | Fan | | |
| 2013/0024777 A1* | 1/2013 | Brakensiek | ............. | G06F 3/048 715/740 |
| 2013/0111579 A1* | 5/2013 | Newman | ............... | G06F 3/0488 726/17 |
| 2013/0194310 A1 | 8/2013 | Vasudevan | | |
| 2013/0222231 A1* | 8/2013 | Gardenfors | ........... | G06F 1/1626 345/156 |
| 2013/0275899 A1* | 10/2013 | Schubert | ............... | G06F 3/0481 715/765 |
| 2013/0290986 A1* | 10/2013 | Kobayashi | ................ | G06F 3/01 719/318 |
| 2013/0303143 A1* | 11/2013 | Schrader | ............... | H04W 12/08 455/418 |
| 2014/0052715 A1 | 2/2014 | Jung | | |
| 2014/0125619 A1 | 5/2014 | Panther | | |
| 2016/0066189 A1* | 3/2016 | Mahaffey | ................ | G06F 21/88 455/405 |

* cited by examiner

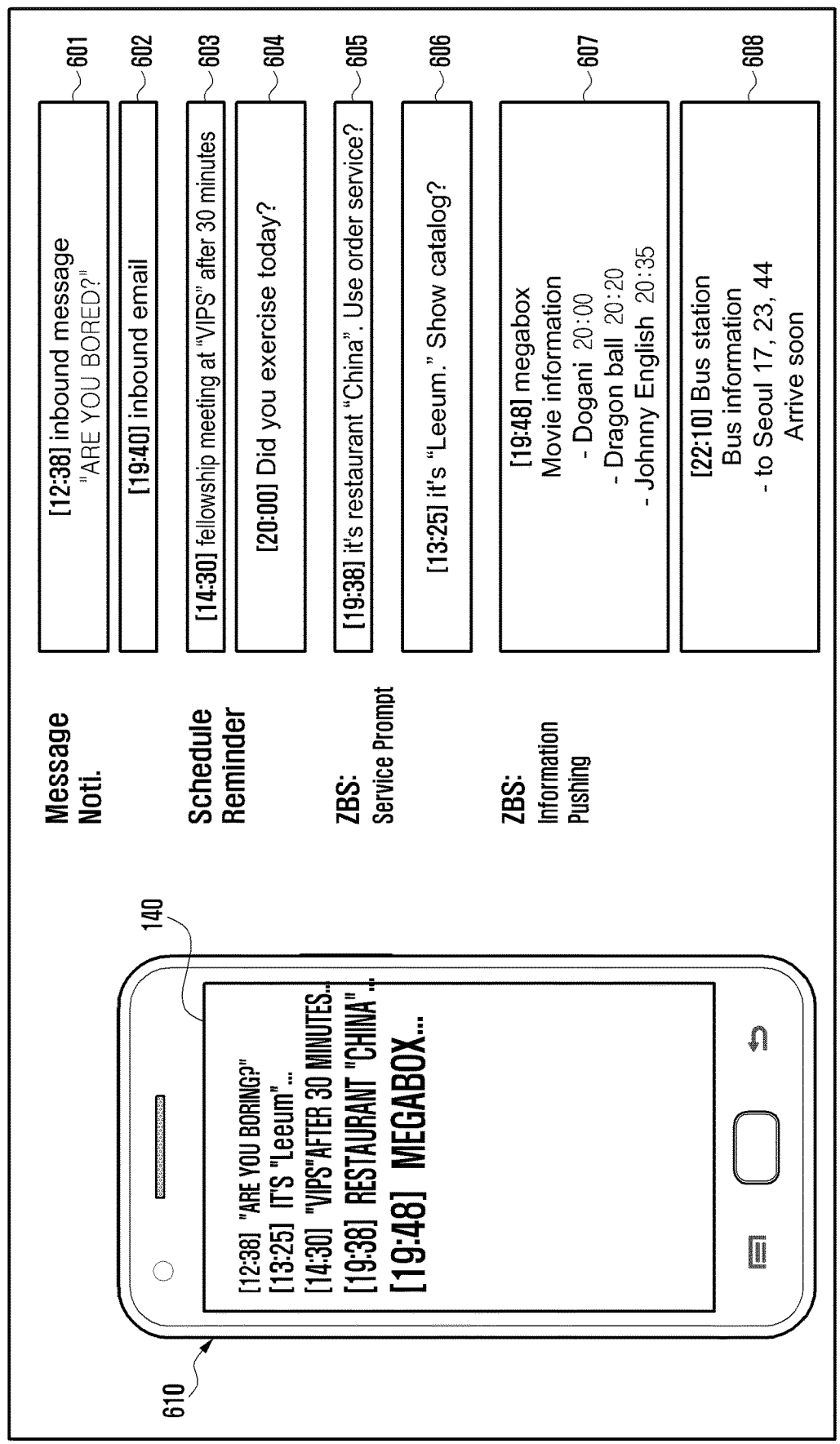

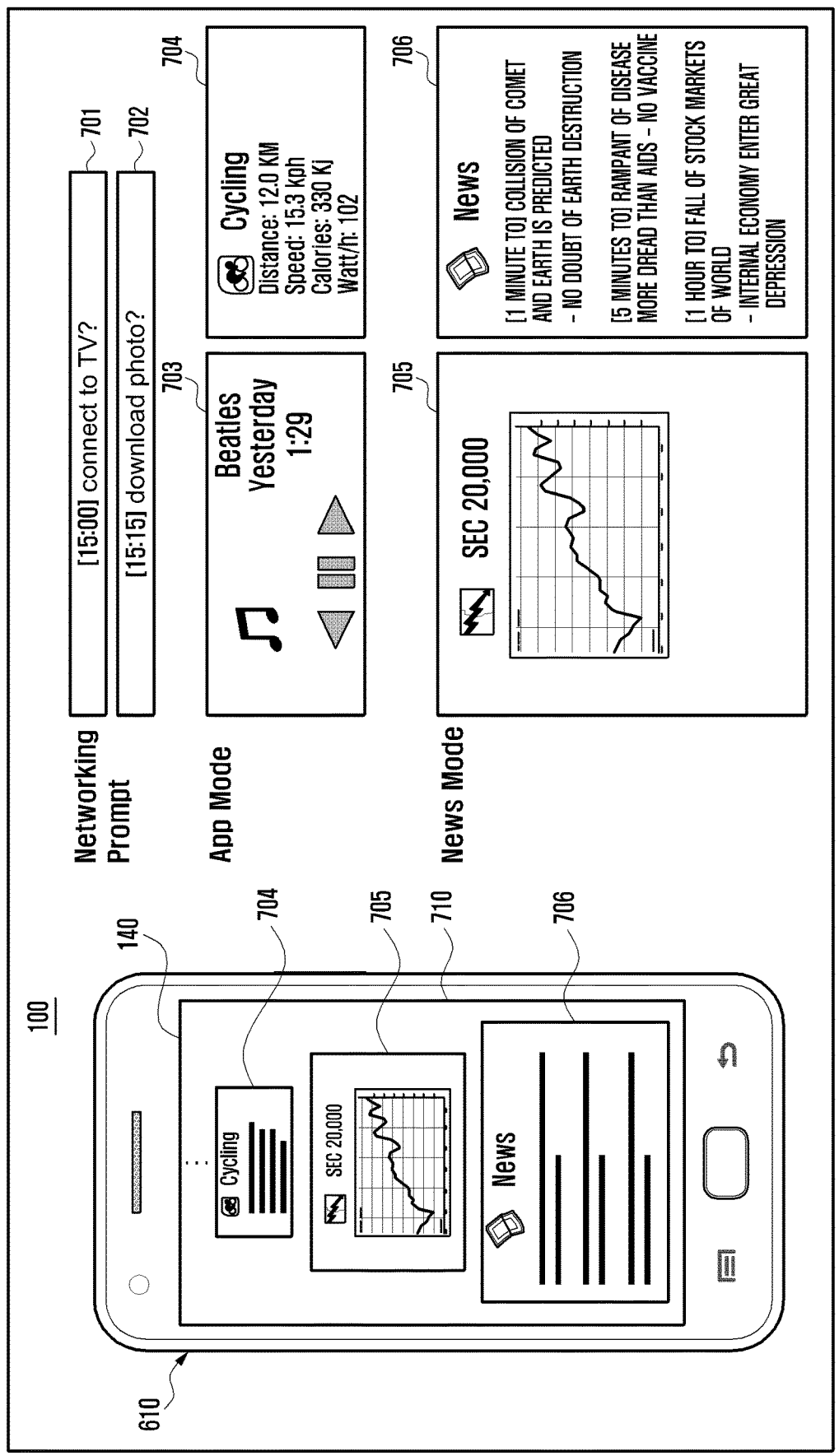

INTELLIGENT EVENT INFORMATION PRESENTATION METHOD AND TERMINAL

PRIORITY

This application is a Continuation of U.S. application Ser. No. 13/856,799, which was filed in the U.S. Patent and Trademark Office on Apr. 4, 2013, and claims priority under 35 U.S.C. § 119(a) to Korean Patent Application Serial No. 10-2012-0035000, which was filed in the Korean Intellectual Property Office on Apr. 4, 2012, the entire disclosure of each of which is hereby incorporated by reference.

BACKGROUND OF THE INVENTION

1. Field of the Invention

The present invention relates generally to intelligent information provision by a terminal, and more particularly, to an intelligent event information presentation method and terminal that process various event information intelligently generated in association with function execution of the terminal.

2. Description of the Related Art

Typically, a mobile phone includes a display that displays a function execution screen. Upon execution of a function, the mobile phone displays content relating to the function on the function execution screen.

Further, the mobile terminal generates various events in association with various functions. Some of these events are even generated when the mobile terminal is in a screen lock state.

For example, for a text messaging function, when an inbound message is received, a conventional mobile terminal automatically presents an inbound message alarm on the locked display screen. However, there are times when a user may not check an inbound message, or does not even want the inbound message alarm to sound. Further, because the conventional mobile terminal cannot determine a user's situation, the conventional mobile terminal still presents the alarm, which may be ignored or cause embarrassment.

These types of event-triggered alarm functions are associated with functions and applications.

A conventional mobile terminal also supports an information search and presentation in response to a user input through a specific application function. Typically, the conventional mobile terminal does not present any information during a sleep mode, and thus, in order for the user to search for specific information, to the user must first release the sleep mode. Further, because the information search is restricted to information that the user has in mind, the conventional information presentation method has a drawback in failing to inform the user of the events out of mind.

SUMMARY OF THE INVENTION

The present invention has been made in an effort to solve at least the above-described problems occurring in the prior art and to provide at least the advantages described below.

Accordingly, an aspect of the present invention is to provide an event information presentation method and terminal that present the event information at an appropriate time, location, and situation, resulting in improved information utilization.

In accordance with an aspect of the present invention, an event information presentation method by a terminal is provided. The method includes collecting event information; presenting at least one of the collected event information, according to a current operation mode; determining whether the terminal is in a sleep mode; and restricting, when the terminal is in the sleep mode, presentation of the at least one of the event information.

In accordance with another aspect of the present invention, a terminal is provided for presenting event information. The terminal includes a display; at least one sensor configured to collect sensing information related to an environment of the terminal; and at least one processor configured to present, via the display, at least one of collected event information according to a current operation mode; determine whether the terminal is in a sleep mode based on the sensing information; and restrict, when the terminal is in the sleep mode, presentation of the at least one of the event information.

BRIEF DESCRIPTION OF THE DRAWINGS

The above and other aspects, features, and advantages of certain embodiments of the present invention will be more apparent from the following detailed description when read in conjunction with the accompanying drawings, in which:

FIG. 6 is a diagram illustrating an operation of an intelligent information presentation function according to an embodiment of the present invention; and FIG. 7 is a diagram illustrating an operation of an intelligent information presentation function according to an embodiment of the present invention.

DETAILED DESCRIPTION OF EMBODIMENTS OF THE INVENTION

Figure 1:
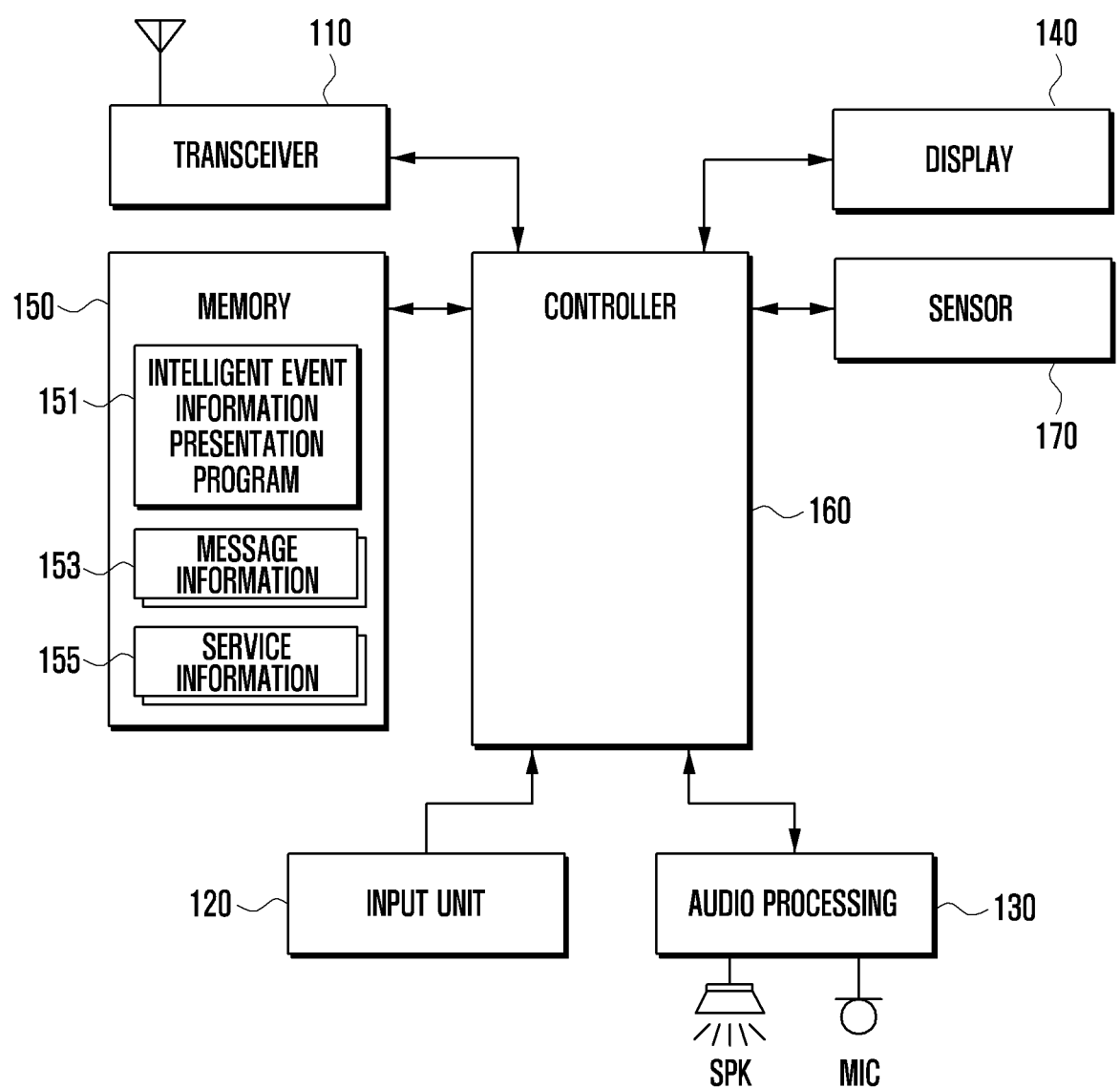
FIG. 1 is a block diagram illustrating a terminal supporting intelligent event information presentation according to an embodiment of the present invention.

Various embodiments of the present invention are described in detail below with reference to the accompanying drawings. Detailed descriptions of well-known functions and structures incorporated herein may be omitted to avoid obscuring the subject matter of the present invention.

For similar reasoning, some of elements are exaggerated, omitted or simplified in the drawings and the elements may have sizes and/or shapes different from those shown in drawings, in practice. The same reference numbers are used throughout the drawings to refer to the same or like parts.

FIG. 1 is a block diagram illustrating a terminal supporting intelligent event information presentation according to an embodiment of the present invention.

Referring to FIG. 1, the terminal includes a transceiver 110, an input unit 120, an audio processor 130, a display 140, a memory 150, a controller 160, and a sensor 170.

The terminal presents specific event information according to preset scheduling information and user settings, and the information presentation controls a presentation amount, a presentation time, and a presentation type of the event information, based on environmental information collected in relation to the terminal. The terminal also adjusts the presentation time, the presentation amount, and the presentation type of the event information according to an operation mode set by the user. Particularly, the terminal is capable of providing appropriate information during a sleep mode or when the terminal is locked, thereby improving information utilization. The event information is displayed on a screen of the display 140, e.g., an inbound message alarm and a server service notification message alarm.

The transceiver 110 establishes communication channels with other terminals and servers, and receives event information. For example, the transceiver 110 receives messages, such as text messages, chatting messages, and multimedia messages, from another terminal.

The transceiver 110 also receives a call connection request message from another terminal, service information from a server, and in order to receive the service information, transmits the terminal's current location information to the server.

The transceiver 110 establishes a communication channel with the server according to the activation of a preconfigured application, and receives service information requested by the application, from the server. Accordingly, the transceiver 110 may support Second Generation (2G), Third Generation (3G), Fourth Generation (4G), etc., Time Division Multiple Access (TDMA), Code Division Multiple Access (CDMA), Wideband CDMA (WCDMA), Frequency Division Multiple Access (FDMA), and Orthogonal FDMA (OFDMA) communication techniques, and other wired and wireless communication protocols that support transmitting event information.

For example, the transceiver 110 establishes at least one of a voice channel, a message channel, and a data channel with another terminal or an external server in real time, periodically, or persistently.

The input unit 120 generates various input signals for manipulating the terminal, in response to user input with a plurality keys and touch map provided on a touchscreen. For example, the input unit 120 generates an input signal for displaying event information received from another terminal or a server, for searching for specific event information, for releasing a sleep mode or a lock mode, and for deleting received event information under a user's control.

The generated input signals are sent to the controller 160, which executes a function according to the input signal.

The audio processor 130 includes a speaker (SPK) for outputting audio signals and a microphone for receiving audio signals. When specific event information is received from another terminal or an external server, the audio processor 130 outputs an alarm notifying of the receipt of the event information.

For example, the audio processor 130 outputs an alarm sound or a notification message, which notifies the user of the receipt of a certain message, such as a voice message, a chatting message, a multimedia message, etc., from another terminal.

The audio processor 130 parses content of a received message to output the message in the form of voice, according to user settings.

Additionally, when information on a service associated with a current location of the terminal is received from an external server, the audio processor 130 outputs a service information notification sound.

Further, when an event information search occurs, the audio processor 130 outputs a sound effect in accordance with the signal input for search.

Notification sounds or sound effects from the audio processor 130 can be disabled according to the user settings.

The display 140 provides various visual interfaces associated with the operation of the terminal. As indicated above, the display 140 can be configured with a touch panel for supporting touch input function and a display panel for displaying information. The display 140 displays a message screen for displaying a message received from another terminal and a service information screen for displaying service information received from a server.

The memory 150 stores application programs associated with operating the terminal and application programs for supporting supplementary functions of the terminal. For example, the memory 150 stores an Operating System (OS) of the terminal and application programs for receiving message information and establishing a connection with an external server.

In accordance with an embodiment of the present invention, the memory 150 stores an intelligent event information presentation assistant program 151, message information 153 received from terminals, and service information 155 received from servers. Herein, the service information 155 includes at least one of service information generated by an application running in the terminal, service information received from an external server according to the execution of an application function based on information collected by the sensor 170, and detailed service information received from an external server, in response to an information request.

The intelligent event information presentation assistant program 151 supports displaying event information, for example, about at least one of message information received from outside, the service information received from outside, and the message information generated inside of the terminal, on the display 140. The intelligent event information presentation assistant program 151 is called from the memory 150, by the controller 160, to be loaded for supporting an intelligent event information presentation function.

The intelligent event information presentation assistant program 151 includes a routine for checking a currently configured event information presentation mode, a routine for sorting event information to be displayed according to the configured event information presentation mode, and a routine for outputting the sorted event information on the display 140, according to a predetermined schedule and display format.

The intelligent event information presentation assistant program 151 also includes a routine for outputting event information in a sleep mode, a routine for defining mode settings, and a routine for outputting event information in a low power mode.

The routine for checking an event information presentation mode includes a routine for determining whether a currently configured mode is a restriction mode or a non-restriction mode. In a restriction mode, a number of or size of the event information to be presented is restricted. Examples of a restriction mode include, but are not limited to, a driving mode, a theatre mode, a conference mode, a sleep mode, etc.

In a non-restriction mode, the event information to be presented is not restricted. Examples of a non-restriction mode include, but are not limited to, an application mode, a news mode, a rest mode, a toilet mode, an exercise mode, a travel mode, a dining mode, a normal mode, etc.

Each of the restriction mode and the non-restriction mode may include sub-modes configured differently.

The restriction mode and the non-restriction mode can also be configured different in presentation formats.

The intelligent event information presentation function 151 is not limited in number or type of the operation modes and operations modes can be selectively added or deleted according to a designer's intention, and the number of event information to be presented and/or presentation format per mode, can also be adjusted by the designer or a user.

The message information 153 includes various types of messages received from other terminal and/or external servers. For example, the message information 153 includes a short messaging service message, a voice message, a notification message, a multimedia message, a chatting message, an email message, an alarm message, etc. The message information 153 also includes a call connection request message.

The terminal stores the message information 153 in the memory 150 and presents the message information 153 on the display 140 for checking content.

The message information 153 can be presented in a predetermined format, e.g., presented for 15 seconds with a predetermined brightness, and then removed from the display 140. The message information 150 can be presented with a predetermined number of other messages. The message information 153 can also be presented during a sleep mode.

The service information 155 includes information received from an external server. The service information 155 includes information received from the external server in response to a request generated by a specific application function of the terminal and/or information related to sensor information collected by the sensor 170. For example, the service information 155 includes location-based service information acquired based on a current location of the terminal and includes news information provided by a new server through a news application.

The service information 155 can also be acquired as a result of a function execution of the terminal. For example, when a metering function for measuring a travel speed and a travel distance of the terminal is operated, the service information 155 can include the moving speed and a distance travelled by the metering function with the assistance of the sensor 170. Additionally, calorie consumption and generated electricity may be calculated based on the measured speed and distance. The service information 155 may be temporarily or semi-persistently stored and managed in the memory 150.

The sensor 170 collects ambient information of the terminal. For example, the sensor 170 includes a temperature sensor, a humidity sensor, an acceleration sensor, a location acquisition sensor, a gyro sensor, etc. The sensor 170 collects diverse information around the terminal and supplies the collected information to the controller 160. Particularly, the sensor 170 collects the location information and moving speed of the terminal and then supplies the collected information to the controller 160.

The controller 160 controls power supply and distribution and signal flows among the terminal. The controller 160 controls signaling for supporting intelligent information presentation service according to an embodiment of the present invention.

Figure 2:
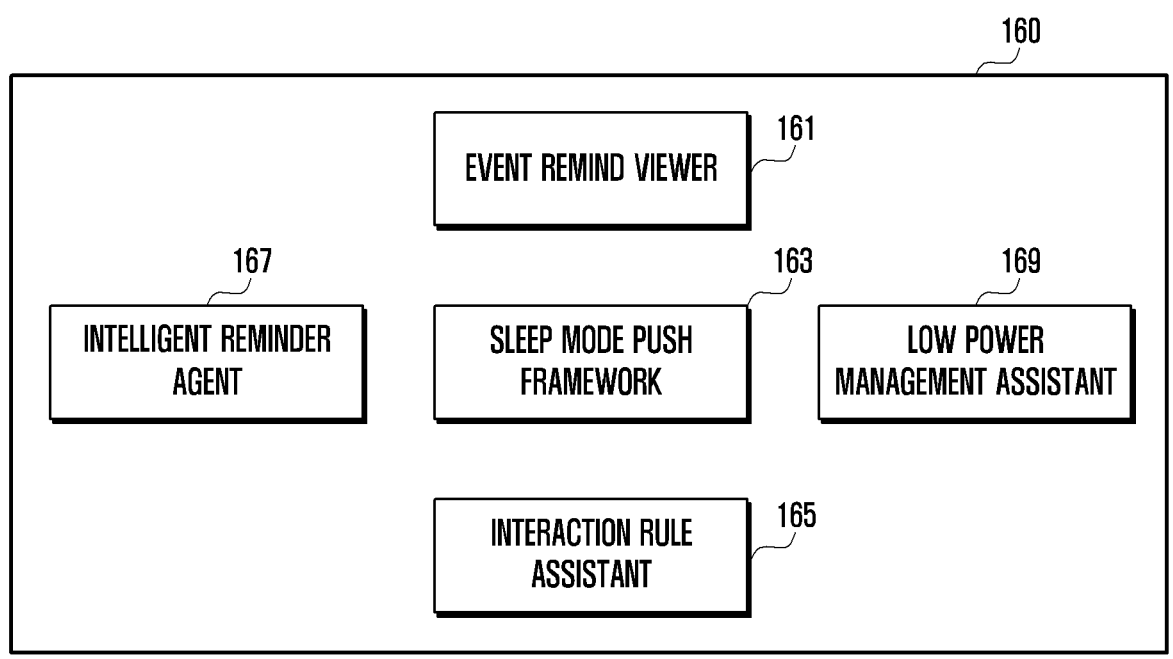
FIG. 2 is a function block diagram of a controller of a terminal according to an embodiment of the present invention.

FIG. 2 is a function block diagram of a controller of a terminal according to an embodiment of the present invention.

Referring to FIG. 2, functions of the controller 160 include an event remind viewer 161, a sleep mode push framework 163, an interaction rule assistant 165, an intelligent reminder agent 167, and a low power management assistant 169.

If at least one of new message information and service information is received, the event remind viewer 161 controls the display 140 to display the received event information. For example, if new event information occurs, the event remind viewer 161 controls corresponding event information to be presented on the display 140 for 15 seconds and then removed therefrom.

The event remind viewer 161 controls 5 to 6 old event information to be presented on the display 140 with the new event information.

The event remind viewer 161 also presents a temporal difference between event information using font sizes or visual effects of the presented event information. That is, the event remind viewer 161 controls the old event information to be presented with a relatively smaller font size. The event remind viewer 161 also controls the event information to be removed from the display 140, starting with the oldest event information.

The event remind viewer 161 differentiates among event information having different occurrence times in various ways, in addition to applying different font sizes or disappearing times, as described above. For example, the event remind viewer 161 differentiates among the event information having different occurrence times by color, brightness, or boldness.

For example, when a touch or certain gesture is detected at a position on the front or side surface of the terminal, the event remind viewer 161 executes a screen scroll function. In interaction with the touch or other gesture, the event remind viewer 161 drives the screen scroll function to navigate the event information items. The scroll function can be activated even when the display 140 of the terminal is presenting event information during a sleep mode or other modes. If a specific touch or gesture event occurs during a sleep mode, the display 140 of the terminal presents previous event information on a sleep mode screen.

When a scroll control event occurs, the event remind viewer 161 controls the display 140 to present previous event information with current event information according to the corresponding scroll control event.

While the new event information is presented on the display 140, the user can generate the scroll control event to navigate the previously occurred event informations.

The event remind viewer 161 supports an information history flip retrace function for previous event information, which has been removed from the display 140 during the new event information checking process.

The terminal can also be configured such that the sleep mode push framework 163 controls the aforementioned intelligent event information presentation function operating in the sleep mode.

The sleep mode push framework 163 is responsible for receiving information to be reminded to the user by application programs operating or to be operated according to preset schedule information in the terminal and rendering the sleep mode screen of the display 140. The sleep mode push framework 163 is responsible for event information history management, profile environment configuration, low power mode transition, sleep mode screen rendering, etc. That is, the sleep mode push framework 163 controls, when event information (e.g., a message information) is received from outside, to determine a presentation position and presentation format of a corresponding message on the sleep mode screen.

When a user input for checking message information is detected, the sleep mode push framework 163 unlocks the sleep mode screen to display a screen providing the user with the detail of the corresponding message information. If no message information check is requested, the sleep mode push framework 163 handles the message information in an un-checked state and notifies the user of the un-checked message reception.

The sleep mode push framework 163 also configures a profile environment for event information presentation in the sleep mode. That is, the sleep mode push framework 163 determines whether to support the scrolling function for the event information in response to specific gesture or touch event. Accordingly, the sleep mode push framework 163 requests the interaction rule assistant 163 to assist configuring the related function.

The sleep mode push framework 163 controls the operation mode into a low power mode during the sleep mode. Particularly, the sleep mode push framework 163 renders a predetermined output format in order for the terminal to operate in the low power mode in the event information presentation process in the sleep mode. In order to support the low power mode, the sleep mode push framework 163 requests the low power management assistant 169 to operate the low power mode.

The interaction rule assistant 165 is responsible for transitioning from the terminal from the sleep mode to the wakeup mode and vice versa, according to a control behavior pattern input of touch/gesture pattern or voice input. The interaction rule assistant 165 retrieves detail view information of a message information or the detail view information of a service information or designating an interaction rule for checking the user-intended selection. For this purpose, the interaction rule assistant 165 provides a setting interface in order for the user to set the control behavior pattern including at least one of touch/gesture pattern and voice input. As described above, the control behavior pattern can be defined for transitioning between a sleep mode and a wakeup mode, or selected by the user among the predefined patterns.

The user can register at least one of touch/gesture patterns and voice inputs through a setting interface for use in switching between the sleep mode and wakeup mode. Particularly, the user selects one of the operation modes, including the aforementioned restriction mode and non-restriction mode, using the touch/gesture pattern and voice input.

For example, a first control behavior pattern including at least one of the first touch/gesture pattern and voice input can be configured to activate at least one of the aforementioned registration modes, and a second control behavior pattern including at least one of the second touch/gesture pattern and voice input can activate at least one of the aforementioned non-restriction modes.

Afterward, the user inputs the first control behavior pattern to control the terminal to operate in the restriction mode and the second control behavior pattern to control the terminal operate in the non-restriction mode. Accordingly, the terminal switches between the sleep mode and wakeup mode, between a preview mode and a detailed view mode, between an activation mode and a deactivation mode, etc., according to the first and second control behavior patterns.

If the restriction mode or the non-restriction mode is activated, the terminal configures at least one of a number of or size of the event information to be presented, and a presentation format according to the activated mode.

The intelligent reminder agent 167 is an external/internal context extraction agent for monitoring events occurring in association with the sensor 170 and the terminal function execution and generating notification message. The intelligent reminder agent 167 defines an external environment based on ambient environmental information collected by the sensor 170 and controls, e.g., a number of event information to be presented and a presentation format according to the external environment. The intelligent reminder agent 167 also requests an external server to search for location service information based on location-based information provided by a location sensor and receives the location-based service information from the external server.

The intelligent reminder agent 167 also collects the event information generated by various application functions running in the terminal. That is, the intelligent reminder agent 167 collects event information including at least one of message information and service information generated in the terminal, and supplies the collected event informations to the event remind viewer 161 and the sleep mode push framework 163.

The low power management assistant 169 optimizes a text color, a font, a blinking time-slot, etc., for low power consumption of the display 140 (e.g., RGB-dominant text color and gray scaling).

In the above description, the sleep mode screen is displayed when the terminal has transitioned to the sleep mode, lock screen state, or a display power-off state.

The low power management assistant 169 controls the power supply to the display 140, such that a message or information is presented at a certain region when the display 140 powers off. For example, when the display 140 includes an Active-Matrix Organic Light-Emitting Diode (AMO-LED) that is capable of per-cell on/off control, the low power management assistant 169 can control the display 140 to perform RGB-dominant text color and gray scaling.

As described above, the terminal supporting intelligent information presentation according to an embodiment of the present invention adjusts a number of or size of event information to be presented and adjusts a presentation format according to ambient environment, user settings, and operation modes, such that the user can efficiently check useful events. As a result, the user can check event information in association with ambient environment information and/or an operation mode and acquire intended information quickly and reliably, thereby improving terminal utilization efficiency.

Figure 3:
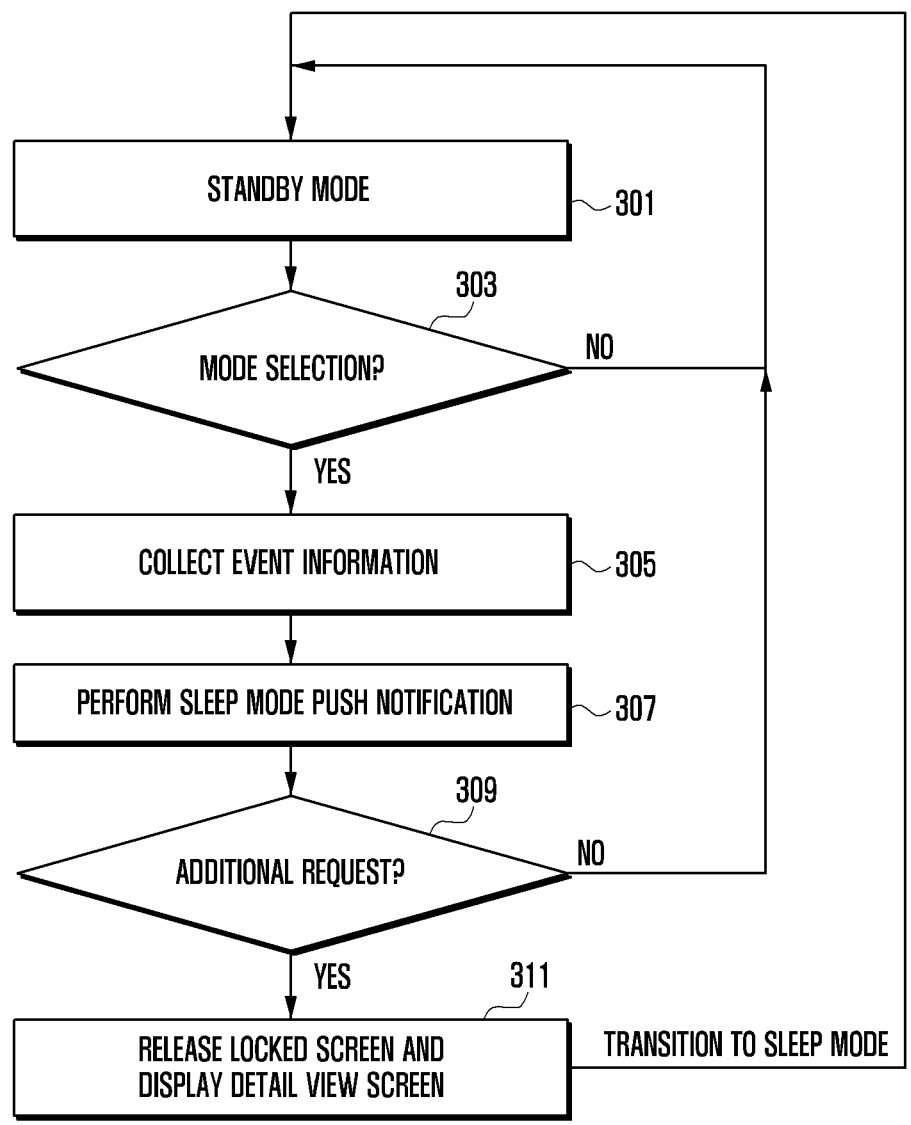
FIG. 3 is a flowchart illustrating an intelligent event information presentation method according to an embodiment of the present invention.

FIG. 3 is a flowchart illustrating an intelligent event information presentation method according to an embodiment of the present invention.

Referring to FIG. 3, the controller 160 controls the terminal to operate in a standby mode in step 301.

In step 303, the controller 160 determines whether a model selection signal is input by the user, and if no mode selection signal is input, the controller 160 maintains the standby mode in step 301.

When a mode selection signal is input in step 303, the controller 160 collects event information in step 305, and performs sleep mode push notification in step 307. That is, the controller 160 displays the collected event information on a sleep mode screen of the display 140.

In step 309, the controller 160 determines whether an additional request for specific event information is input, and if no additional request for specific event information is input, the controller 160 maintains the standby mode in step 301.

When an additional request for specific event information is received in step 309, the controller 160 unlocks the lock screen of the standby mode to display a detail view screen showing the event information indicated by the request signal in step 311.

Thereafter, the controller 160 returns to the standby mode in step 301.

For example, the event information can be location-based service information received from an external server, based on location information acquired by the sensor 170, and the detail view screen can present detailed information received from the server in association with the service information item selected on the screen. Herein, the detailed information can be temporarily or semi-persistently stored in the memory 150.

Although not described above, the user may preset the terminal for user mode selection according to the assistance of the interaction rule assistant 165, as described above. In the procedure for the sleep mode push framework 163, to present at least one of the messages and information on the display 140, the controller 160 may control the message and information to be presented at a low power consumption level.

Figure 4:
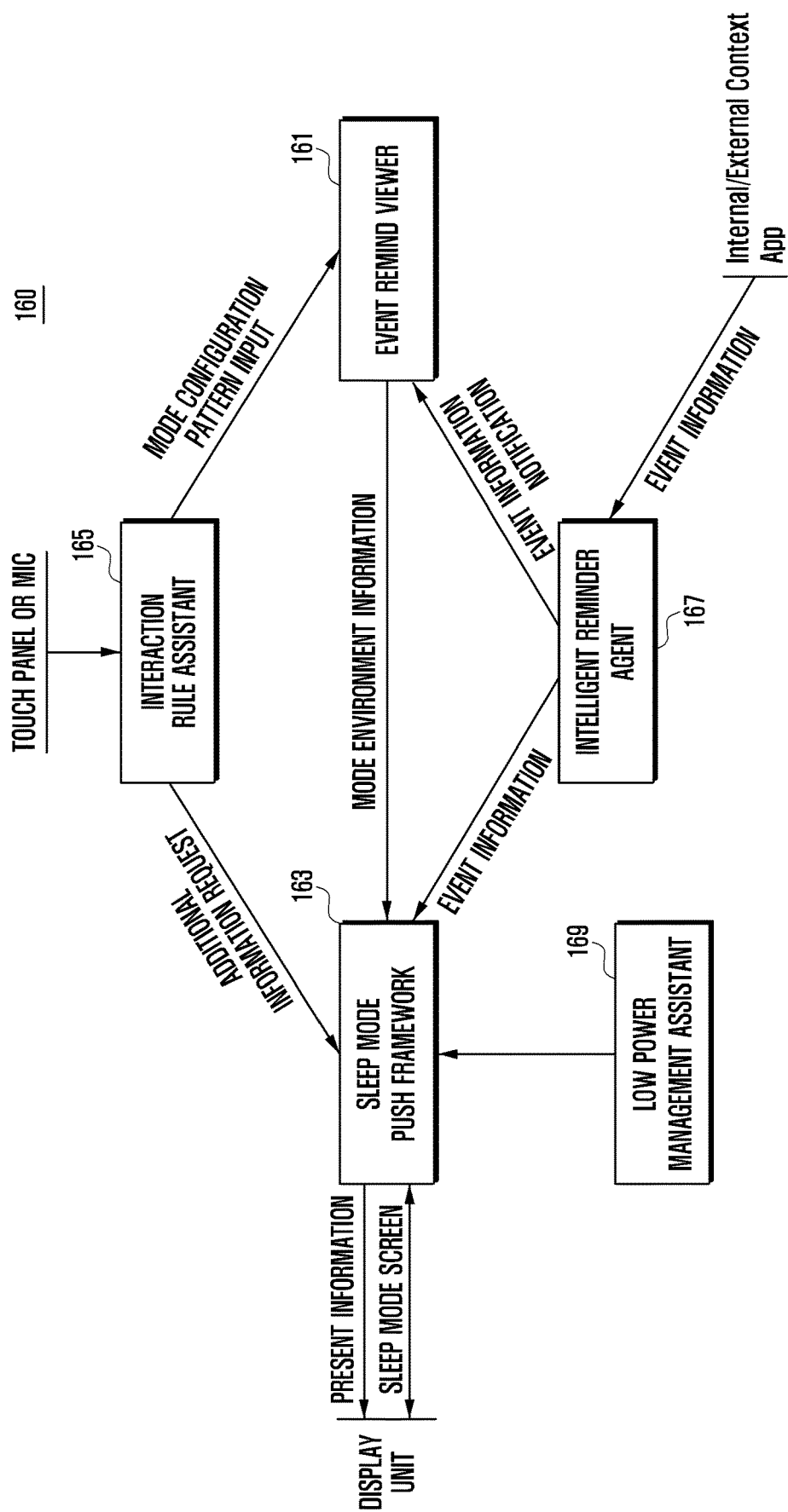
FIG. 4 illustrates an intelligent event invention presentation mechanism according to an embodiment of the present invention.

FIG. 4 illustrates an intelligent event invention presentation mechanism according to an embodiment of the present invention. Specifically, FIG. 4 illustrates intelligent event invention presentation using the function blocks of the controller 160, as illustrated in FIG. 2.

Referring to FIG. 4, the user sets the interaction rule assistant 165 to configure a specific mode of the intelligent event information presentation function. When the per-mode control behavior pattern is made by the interaction rule assistant 165, the operation mode of the event remind viewer 161 can be set.

In order to collect the remind event informations, the intelligent reminder agent 167 is in active state and monitors to detect the event information with the sensor 170. If the Internal/External Context is extracted and event information to be reminded to the user is detected according to the predefined rule, the intelligent reminder agent 167 notifies the event remind viewer 161 of the event information to be presented and transfers the corresponding event information to the sleep mode push framework 163.

The event remind viewer 161 displays the event information on the sleep mode screen through the sleep mode push frame work 163, based on the configured mode environment information. For example, in a restriction mode, the event remind viewer 161 restricts the presentation of predefined information, among the received event information.

The event remind viewer 161 also supports presentation of the received event information according to the preconfigured settings, when the non-restriction mode is set.

General applications operating in the terminal are capable of presenting corresponding information to the user through the event remind viewer 161, when a remind situation is triggered by a certain event.

When the user generates an input signal for using additional information or an additional service related to a specific event information, i.e., if a predetermined control behavior pattern is input via the interaction rule assistant 165, the controller 160 transitions the terminal to the unlock state of the sleep mode and renders the additional depth information screen received from the sleep mode push framework 163 to activate the corresponding service or application, or presenting the collected additional information.

When the sleep mode push framework 163 is performing information presentation, the low power management assistant 169 controls the information presentation to be performed at an optimized power consumption level. The low power management assistant 169 also supports partial region activation on the touch panel to present the information.

After reminding the user of the information, if a predetermined time duration elapses without a user input or other feedback, or if the control behavior pattern or key manipulation for sleep mode entry occurs, the sleep mode push framework 163 controls the operation state of the terminal to be transitioned to the sleep mode. Afterward, the terminal can control the presentation of the collected event information according to the configured mode.

Figure 5:
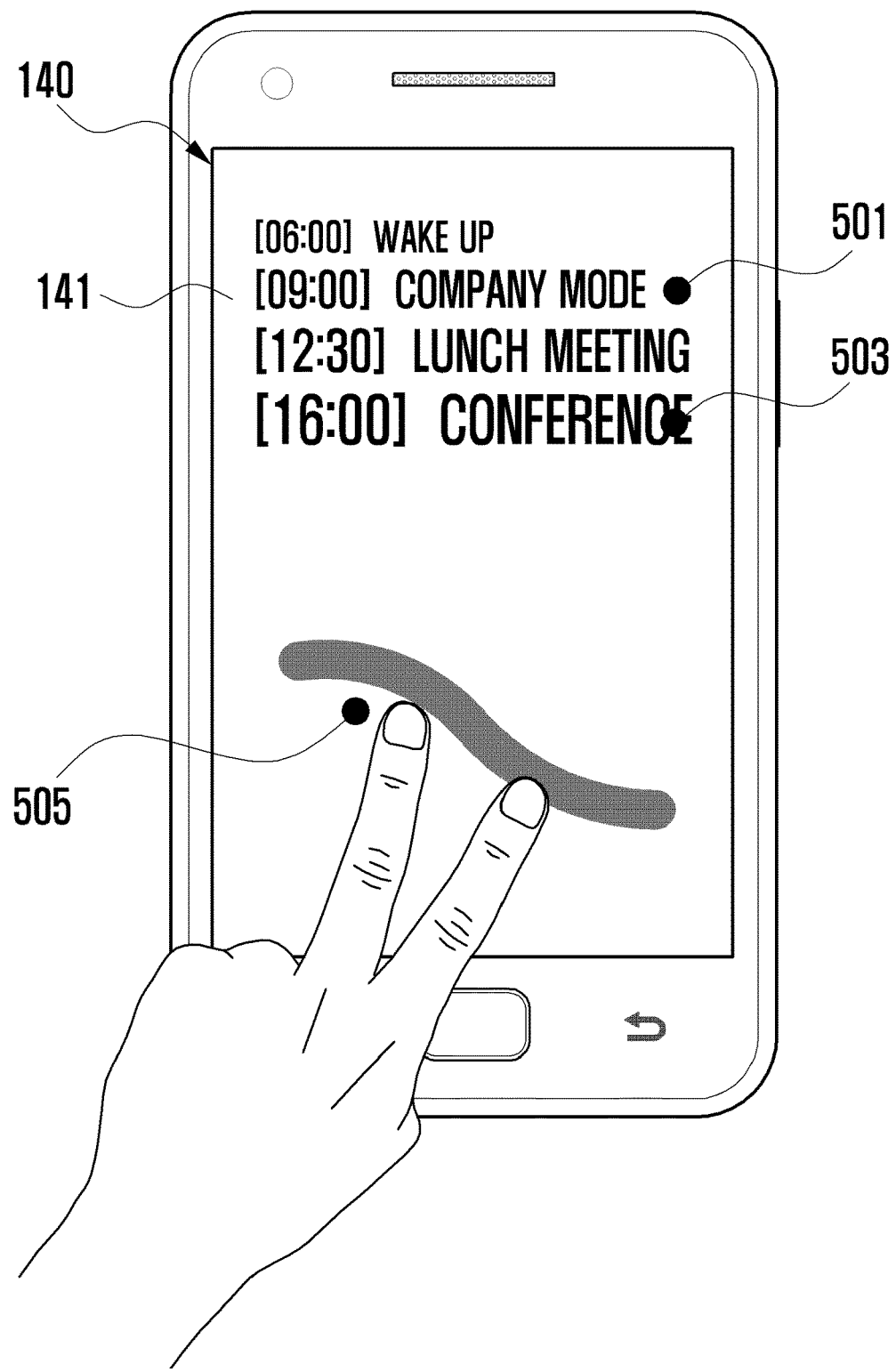
FIG. 5 illustrates an example of a screen interface of an intelligent event information presentation function on a terminal according to an embodiment of the present invention.

FIG. 5 illustrates an example of a screen interface of an intelligent event information presentation function of a terminal according to an embodiment of the present invention.

Referring to FIG. 5, the terminal displays a sleep mode screen 141 on the display 140 a. Here, the terminal is monitoring as to whether a sleep mode entry condition is fulfilled, and if the condition is fulfilled, enters the sleep mode.

For example, when no input detected on the touch panel of the display 140, no gesture detected by the sensor 170, or a signal input for sleep mode entry (e.g., key input signal or predefined gesture event) occurs, the terminal displays the sleep mode screen 141 on the display 140.

After entering the sleep mode, the terminal transitions the screen state to a locked state in which the touch panel detects no touch events.

If an internal/external context is extracted according to an event that has occurred with a function execution, the terminal displays the extracted context on the display 140. The terminal presents the context-related information at a predetermined region of the screen of the display 140 with the assistance of the low power management assistant 169. That is, the terminal presents the information in the form of text with text output region pixels RGB-dominantly. Accordingly, the terminal presents text with turned-on pixels at a part of the mostly turned-off pixel (black) screen of the display 140.

The newly occurred event information item can be presented with previous event information items at a predetermined area 501, as the most recently occurred event information 505 is highlighted with brightest, largest, and/or longest exposure. The text can be presented for about 15 seconds while the respective texts are presented with different presentation times. For example, the text corresponding to the most recent event information can be presented for about 15 seconds, while other text corresponding to the previous event information is presented for a time duration, which is gradually shortened in sequence.

When the texts are presented, the controller 160 activates at least one of the touch panel of the display 140 and the microphone. If a specific touch/gesture pattern input is detected on the display 140 or a voice input is detected through the microphone, the controller 160 activates the scroll function according to the input.

After the scroll function has been activated, the terminal interactively navigates the text items corresponding to the previous event information in accordance with a scroll event. The user can navigate the text items of event information through the scroll event control. The user is also capable of controlling the terminal to wake up from the sleep mode by making a touch event with a predetermined gesture pattern 505 on the display 140.

The terminal performs External/Internal Context Monitoring based on the sensing information collected by the sensor 170 and generates a notification message that notifies of the extraction of external/internal context.

FIG. 6 is a diagram illustrating an operation of an intelligent information presentation function according to an embodiment of the present invention.

Referring to FIG. 6, the terminal presents event information occurring, according to internal/external context monitoring.

Message information is received according to a message service function, and the terminal presents the received message information at a predetermined area 601 of the sleep mode screen of the display 140. Email message information is received, and the terminal presents the received email message information 602 on the sleep mode screen of the display 140.

Accordingly, the terminal presents message information or email message information with a predetermined number of previously received message information or email message information. The terminal also presents the message information with specific event information occurring in the terminal. The message information may include chatting message information.

A schedule reminder included in the scheduling program of the terminal assists the display 140 in displaying the message information according to the predetermined schedule. For example, the schedule reminder checks the scheduled items for arrival times of the items to be reminded to the user. When there is schedule information to be reminded of the user, the controller 160 presents the schedule information on the sleep mode screen. The schedule information 603 and 604 is presented on the display 140.

Although FIG. 6 illustrates two message notices and schedule information items, the number of displayed items may vary.

The terminal supports a location-based information provision service. Accordingly, the terminal provides an external server with information on a current location, determined by a location sensor of the sensor 170. The terminal then receives useful information from the external server in association with the current location.

In FIG. 6, the terminal receives information about stores near the current location, from the server, as illustrated by reference numbers 605 and 606. The terminal can also execute an application for supporting product purchase and ordering service automatically. The terminal may also display a message asking the user whether to execute a purchase and an ordering service application.

The terminal filters specific service information items to be provided to the user among the location-based service information items. More specifically, the terminal checks the terminal usage history and executes user favorite applications, such as a movie ticket reservation application and bus schedule check application to collect the movie schedule or bus schedule information to be provided to the user, information items 607 and 609. The terminal presents the collected movie schedule information and/or bus schedule information on the sleep mode screen of the display 140.

The message information and service information provided by the terminal can be changed according to the operation mode and priorities of the collected message information and service information. In the non-restriction mode such as the rest mode, the terminal presents the schedule service information items filtered among the location-based service information, without any restriction.

In a travel mode, the mobile terminal filters the bus and subway schedule information among the collected service information and presents the filtered transportation-related information with priority.

In a dinning mode, the terminal provides the user with location-based restaurants information.

In the terminal, different operations modes (e.g., rest mode, travel mode, dinning mode, etc.) can be selected by the user or set automatically based on the information provided by the sensor 170. That is, when the sensor 170 detects a predefined movement pattern, the terminal enters the travel mode automatically. The terminal can enter the dinning mode automatically when the location information collected by the sensor 170 relates to a restaurant. The terminal can also enter the rest mode when the current location information relates to a park, and can automatically enter the sleep mode when the illuminance sensed by the illuminance sensor is below a predetermined illuminance and the current time is in a predetermined bedtime range.

The terminal can also automatically enter the conference mode with the involvement of the intelligent information presentation function when the current location is identified as the conference room in such a reason that a communication channel is established with a Wi-Fi module installed in the conference room or a predetermined tag identifying the conference room is detected.

When operating in a restriction mode, such as a conference mode or a rest mode, the terminal stops collecting location-based service information and restricts information presentation. However, the terminal can also present the information preset by the user or having a high priority, such as an urgent message or an urgent schedule alarm information, even in the conference mode or bedtime mode. For this purpose, the terminal assigns priorities to the operation modes and event information types to be presented.

When the event information occurs, the terminal checks the priority of the current operation mode and, if the priority of the event information is equal to or higher than the priority of the operation mode, presents the event information on the screen. If the priority of the event information is lower than that of the operation mode, the terminal ignores the event information. The terminal discards the event information or stores the event information temporarily, such that the event information is presented on the display 140, after the operation mode is switched.

The terminal presents the aforementioned message information and service information on the screen in a sequence as denoted by reference number 610. Specifically, FIG. 6 illustrates a screen shot taken at 19:48.

FIG. 7 is a diagram illustrating an operation of an intelligent information presentation function according to an embodiment of the present invention.

Referring to FIG. 7, the terminal presents event information generated by a specific application function. For example, when connected to a home network or a specific radio network, the terminal presents a user-specific function notification message notifying the user of the functions available through the network connection, as denoted by reference number 701 and 702.

With the notification message, the user can check the services available in the current situation and select a message to activate a terminal function related to the corresponding message. If the user inputs a specific control behavior pattern or selects a message and then inputs a predetermined control behavior pattern when notification messages are presented, the terminal executes a home networking function.

For example, the terminal establishes a communication channel with an electric appliance, such as TV, according to a user message selection. The terminal also connects to a Wi-Fi network to present a message notifying of downloading a file stored in a server, according to predetermined schedule information, as denoted by reference number 702.

If the user makes a control behavior pattern for selecting the corresponding message, the terminal starts receiving the file from the corresponding server. If the file has been downloaded completely, the terminal executes the received file automatically.

The display 140 of the terminal presents the message generated by a predetermined application function, as denoted by reference numbers 703 and 704. More specifically, the terminal operating in application mode, activates predetermined applications. For example, the terminal controls a music playback function. When the music playback function is activated, if the operation mode transitions to the sleep mode and a specific message presentation is requested by the music playback function, the terminal presents the corresponding message on the sleep mode screen, as denoted by reference number 703.

For example, the terminal controls the display 140 to present the file name and the remaining play time before a predetermined time of the end of the playback. The terminal also controls the display 140 to present the file name and the total play time of a music file to be played next. The terminal also controls the display 140 to present a control key map to assist file playback control. If the user makes a control behavior pattern for manipulating the control key map, the terminal executes the command corresponding to the control behavior pattern.

According to the application mode settings, the terminal activates a cycling function. If there is no additional signal input while the cycling function is activated, the terminal enters the sleep mode and presents the information related to the cycling function on the sleep mode screen. For example, the information includes calorie consumption, calculated based on a distance travelled and a travel speed, and an equivalent electric power, calculated based on the motion quantity.

The terminal also activates a news mode in response to a user request. In the news mode, a predetermined application program registered in the news mode configuration stage is activated to acquire information from a server and present the acquired information on the sleep mode screen, as denoted by reference numbers 705 and 706. When the acquired information includes an image, the terminal simplifies the image and then displays the simplified image on the sleep mode screen, as denoted by reference number 705.

As described above, when presenting the event information with the assistance of the application function, the terminal supports the event information presentation of at least one application function. That is, the terminal presents messages provided by application functions on the screen of the display 140. For example, the terminal presents information in at least one of the areas 703 to 706, according to the information presentation event of the corresponding application function.

The terminal also displays event information on the screen according to the aforementioned application functions, as denoted by reference number 710. The terminal presents the event information in such a way that the more recent the event information occurs the larger the font size is. The terminal divides the screen into parts for presenting the event information generated by the respective corresponding application functions.

As described above, the intelligent event information presentation method and terminal of the present invention present event information items in accordance with the user settings and/or ambient environment information.

Although not illustrated, the terminal may include other function modules according to the utilization purpose. That is, the terminal may include a short range communication module for short range communication, wired and wireless data communication interfaces, Internet access module for supporting access to the Internet, digital broadcast module receiving and playing digital broadcast signal, etc. Further, the terminal may include other components, which are equivalent to the above-described components according to the tendency of digital device convergence. Additionally, those skilled in the art will appreciate that the terminal of the present invention is capable of being implemented with or without the aforementioned components and their equivalents according to the utilization purpose of the terminal.

The terminal described herein may be any mobile communication terminal operating with communication protocols adopted in various communication systems, a Portable Multimedia Player (PMP), a digital broadcast player, a Personal Digital Assistant (PDA), a music player (e.g., MP3 player), a game console, a smartphone, a laptop Personal Computer (PC), handheld PC, and other types of information communication and multimedia devices and their equivalents.

As described above, the intelligent event information presentation method and terminal provide a user with useful information, adaptive to user settings or ambient environment information.

Also, the intelligent event information presentation method and terminal of the presentation provide appropriate information at a right time, thereby improving information utilization efficiency.

While certain embodiments of the present invention have been illustrated and described above, it would be obvious to those skilled in the art that various other changes and modifications can be made without departing from the spirit and scope of the present invention, as defined by the following claims and their equivalents.

What is claimed is:

1. An event information presentation method by a terminal, the method comprising:
   collecting event information;
   presenting at least one of the collected event information, according to a current operation mode;
   determining whether the terminal is in a sleep mode; and
   restricting, when the terminal is in the sleep mode, presentation of the at least one of the collected event information,
   wherein restricting the presentation of the at least one of the collected event information comprises:
   turning off a display of the terminal in response to the terminal transitioning to the sleep mode;
   turning on a partial area of the display of the terminal in response to the event information being collected while the display is turned off; and
   presenting the at least one of the collected event information in the partial area, and
   wherein presenting the at least one of the collected event information in the partial area comprises, determining a graphic effect to be applied to the collected event information with the determined graphic effect.

2. The method of claim 1, wherein restricting the presentation of the at least one of the collected event information further comprises:
   determining a priority for each of the at least one of the collected event information; and
   presenting the at least one of the collected event information based on the priorities.

3. The method of claim 1, wherein the at least one of the collected event information is presented on a sleep mode screen.

4. The method of claim 3, wherein the current operation mode comprises at least one of:
   a restriction mode configured to present information filtered from among the collected event information; and
   a non-restriction mode configured to present the at least one of the collected event information without restriction.

5. The method of claim 4, further comprising configuring the current operation mode,
   wherein configuring the current operation mode comprises at least one of:
      assigning a first control behavior pattern for activating one of the restriction mode and the non-restriction mode, and switching to the sleep mode screen; and
      assigning a second control behavior pattern for deactivating on of the restriction mode and the non-restriction mode, and releasing the sleep mode screen,
   wherein the second control behavior pattern is different from the first control behavior pattern.

6. The method of claim 3, further comprising auto-configuring the current operation mode,
   wherein the auto-configuring comprises at least one of:
      automatically configuring the sleep mode restricting the presentation of the at least one of the collected event information based on illuminance and time information;
      automatically configuring a rest mode or a dinning mode, based on a current location indicated by location information of the terminal; and
      automatically configuring a travel mode based on acceleration information.

7. The method of claim 1, wherein presenting comprises presenting the at least one of the collected event information distinctively in one of number of event information, amount of event information, and presentation format, in response to the current operation mode.

8. The method of claim 1, wherein restricting the presentation of the at least one of the collected event information further comprises at least one of:
   presenting currently occurring event information and previously-occurred event information in distinctive font sizes, respectively;
   presenting the currently occurring event information and the previously-occurred event information in distinctive font brightnesses, respectively; and
   presenting the currently occurring event information and the previously-occurred event information in distinctive exposure times, respectively.

9. A terminal for presenting event information, the terminal comprising:
   a display;
   at least one sensor configured to sense information related to an environment of the terminal; and
   at least one processor configured to:
      present, via the display, at least one of collected event information according to a current operation mode;
      determine whether the terminal is in a sleep mode based on the sensed information; and
      restrict, when the terminal is in the sleep mode, presentation of the at least one of the collected event information,
   wherein the at least one processor is further configured to restrict the presentation of the at least one of the collected event information by:
      turning off the display of the terminal in response to the terminal transitioning to the sleep mode
      turning on a partial area of the display in response to the event information being collected while the display is turned off; and
      presenting the at least one of the collected event information in the partial area, and
   wherein presenting the at least one of the collected event information in the partial area comprises:
      determining a graphic effect to be applied to the collected event information based on occurrence time of the collected event information; and
      presenting each of the at least one of the collected event information with the determined graphic effect.

10. The terminal of claim 9, further comprising:
   a transceiver configured to receive at least one of a text message, a voice message, a chatting message, a multimedia message, an email message, and a call connection request message; and
   a memory configured to store an application for supporting a function of the terminal.

11. The terminal of claim 9, wherein the at least one processor is further configured to restrict the presentation of the at least one of the collected event information by:
   determining a priority for each of the at least one of the collected event information; and
   presenting the at least one of the collected event information based on the priorities.

12. The terminal of claim 9, wherein the display is configured to present the at least one of the collected event information on a sleep mode screen.

13. The terminal of claim 9, wherein the current operation mode comprises at least one of:
   a restriction mode configured to present information filtered from among the collected event information; and
   a non-restriction mode configured to present the at least one of the collected event information without restriction.

14. The terminal of claim 13, further comprising at least one of:
   a touch panel; and
   a microphone,
   wherein the touch panel and the microphone are configured to:
      detect a first control behavior pattern for activating one of the restriction mode and the non-restriction mode, and switching to the sleep mode screen, and
      detect a second control behavior pattern for deactivating at least one of the restriction mode and the non-restriction mode, and releasing the sleep mode screen, and
   wherein the second control behavior pattern different from the first control behavior pattern.

15. The terminal of claim 9, wherein the at least one processor is further configured to automatically configure at least one of:

the sleep mode for restricting the presentation of the at least one of the collected event information based on illuminance and time information,
a rest mode or a dinning mode based on a current location indicated by location information of the terminal, and
a travel mode based on acceleration information.

16. The terminal of claim 9, wherein the display is configured to present the collected event information distinctively in one of number of event information, amount of event information, and presentation format, in response to the current operation mode.

17. The terminal of claim 9, wherein the display is configured to present currently occurring event information and previously-occurred event information in at least one of distinctive font sizes, brightnesses, and exposure times, respectively.

* * * * *